United States Patent
Sevvom

(10) Patent No.: US 8,289,015 B2
(45) Date of Patent: Oct. 16, 2012

(54) APPARATUS AND TEST METHOD FOR A HEAD ASSEMBLY IN A DEPOPULATED CONFIGURATION

(75) Inventor: Hossein F. Sevvom, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 1181 days.

(21) Appl. No.: 12/102,521

(22) Filed: Apr. 14, 2008

(65) Prior Publication Data

US 2009/0257142 A1 Oct. 15, 2009

(51) Int. Cl.
*G01R 33/12* (2006.01)
(52) U.S. Cl. ........................................ 324/210
(58) Field of Classification Search .......... 324/210–212; 360/31, 240
See application file for complete search history.

(56) References Cited

U.S. PATENT DOCUMENTS

| | | | |
|---|---|---|---|
| 5,087,884 A | 2/1992 | Brannon | 324/523 |
| 5,726,821 A | 3/1998 | Cloke et al. | 360/67 |
| 6,014,282 A * | 1/2000 | Ito | 360/75 |
| 6,204,660 B1 * | 3/2001 | Lee | 324/212 |
| 6,320,714 B1 | 11/2001 | Moon et al. | 360/67 |
| 6,373,649 B1 | 4/2002 | Walker et al. | 360/67 |
| 6,618,930 B1 * | 9/2003 | Fish et al. | 29/603.03 |
| 8,049,980 B1 * | 11/2011 | Emami | 360/31 |
| 2004/0124832 A1 * | 7/2004 | Makuuchi et al. | 324/212 |
| 2004/0169951 A1 * | 9/2004 | Osaki | 360/55 |
| 2007/0050577 A1 * | 3/2007 | Kimura et al. | 711/162 |
| 2007/0188905 A1 * | 8/2007 | Maeno et al. | 360/53 |

* cited by examiner

*Primary Examiner* — Jay Patidar
(74) *Attorney, Agent, or Firm* — Alan G. Rego; Westman, Champlin & Kelly, P.A.

(57) ABSTRACT

The application relates to utilizing a head assembly, having a default boot-up head and at least one other head, in a depopulated configuration. If, during testing of the head assembly, the default boot-up head is found to be flawed, it designated as faulty in a non-volatile memory in the head assembly. The head assembly with the default boot-up head is used in a data storage device.

14 Claims, 3 Drawing Sheets

APPARATUS AND TEST METHOD FOR A HEAD ASSEMBLY IN A DEPOPULATED CONFIGURATION

BACKGROUND

The present embodiments relate generally to data storage systems and more particularly, but not by way of limitation, to operating a head assembly, used in a data storage system, in a depopulated configuration.

Mass storage devices are one of many components of modern computers. One type of mass storage device is a disc drive. A typical disc drive includes a head stack assembly (HSA) that has one or more magnetic discs which are rotated by a spindle motor at a substantially constant high speed and accessed by an array of read/write heads which store data on tracks defined on the disc surfaces. A printed circuit board assembly (PCBA), which includes electronics used to control the operation of the HSA, is typically mounted to the underside of the HSA to complete the disc drive.

During early stages of a disc drive certification process, drives are tested for head performance and stability. If any one of the heads fails the test, the drive can be removed from the testing equipment to replace the HSA. The drive is then rebuilt with another HSA and tested again. This operation is very costly and in some cases it is more cost effective to leave the drive in the testing equipment, exclude the faulty head (depopulate), and continue with the certification process. Under this condition, if a default boot-up head (a head that is selected to carry out initial data access from one or more discs in the disc drive upon power up) is not faulty, information for the depopulated head is written on system tracks, on one or more discs of the HSA, in a depopulated head table where the default boot-up head has access. During any subsequent power up cycle, the default boot-up head reads information from the system track(s) where the depopulated head table is stored and thereby knows if any of the heads have been depopulated. Currently, in situations where the default boot-up head is faulty, information about the depopulated default boot-up head is stored in a serial flash (SF) memory on the PCBA to be retrieved during power up. This SF memory is only used during a power up cycle and therefore is an extra cost that the PCBA carries indefinitely for this purpose.

The present embodiments address these problems and offers other advantages over the prior art.

SUMMARY

An aspect of the disclosure relates to utilizing a head assembly in a depopulated configuration.

In one method embodiment, heads in a head assembly, which includes a default boot-up head and at least one other head, are tested. If the default boot-up head fails the test, it is designated as faulty in a non-volatile memory in the head assembly.

In an apparatus embodiment, a head assembly includes a non-volatile memory configured to store a status of a head in the head assembly. The non-volatile memory is inaccessible to heads in the head assembly.

In another method embodiment, which relates to a method of using a head assembly having a default boot-up head that is faulty, includes designating the default boot-up head as faulty in the head assembly. The designation of the default boot-up head as faulty is carried out substantially independently of a data storage device in which the head assembly may be used.

These and various other features and advantages will become apparent upon reading the following detailed description and upon reviewing the associated drawings.

DETAILED DESCRIPTION

Figure 1:
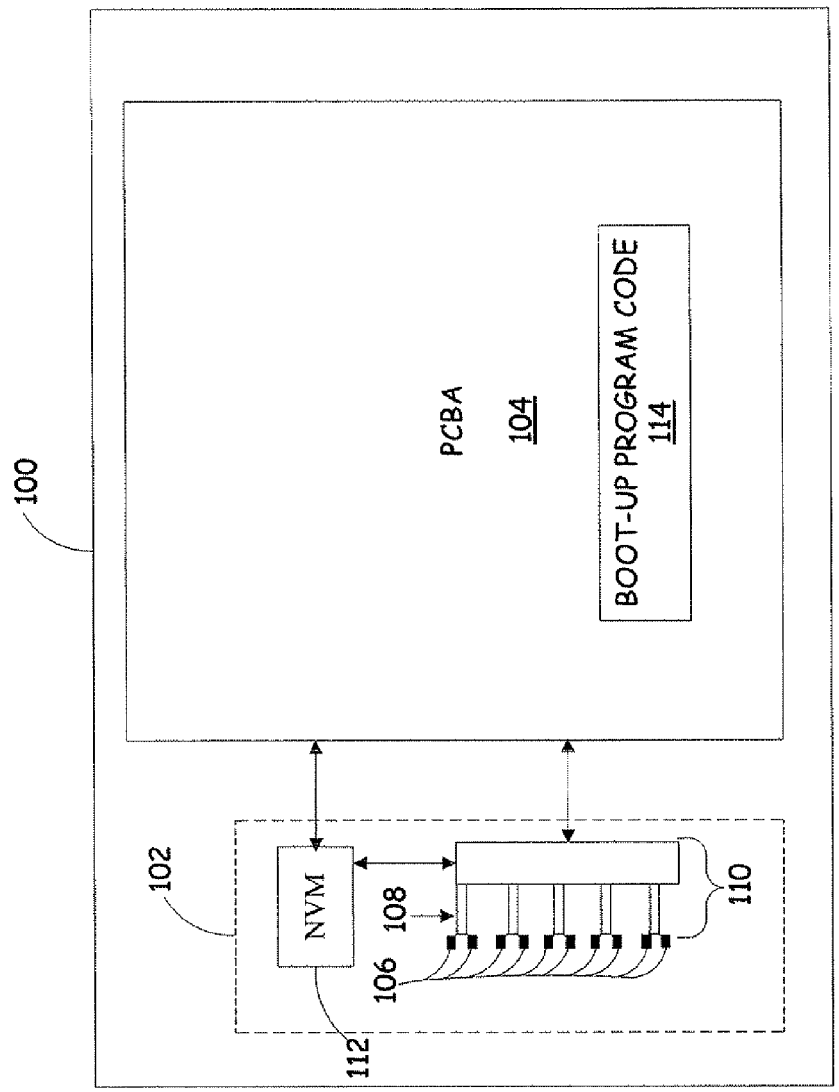
FIG. 1 is a simplified block diagram of a data storage system in accordance with one embodiment.

Referring now to FIG. 1, a simplified block diagram of an exemplary data storage system 100, which utilizes a head assembly 102 having a non-volatile memory (NVM) in accordance with one embodiment, is shown. As can be seen in FIG. 1, data storage system 100 includes head assembly 102 and a printed circuit board assembly (PCBA) 104, which includes electronics used to control the operation of the head assembly 102. Head assembly 102 includes heads 106, which are supported by arms 108 of an actuator 110. Circuitry on the PCBA 104 controls movement of the actuator 110. Also, head assembly 102 includes NVM 112, which is capable of storing status information of at least one of the multiple heads 106, but can be accessed by electronic circuitry on the PCBA 104. The head status information indicates whether the at least one head of the multiple heads 106 is faulty. It should be noted that NVM 112 cannot be accessed by heads 110. In one embodiment, determination of whether the at least one head of the multiple heads 106 is faulty is carried out during certification of data storage device 100. It should be noted that, prior to carrying out the certification process, the data storage device 100 is configured such that heads 106 are ordered (numbered sequentially, for example). Further, in one embodiment, PCBA 104 includes boot-up program code 114 that includes instructions to select a lowest numbered head of the multiple heads 106 to carry out initial data access in storage device 100 upon power up. In such an embodiment, the lowest numbered head of the multiple heads 106 is referred to as the default boot-up head. In general, a default boot-up head is a head that is selected to carry out initial data access in the data storage system upon power up. In one embodiment, if the lowest numbered head is faulty, the boot-up program code 114 selects the next lowest numbered head of the multiple heads to carry out the initial data access. In general, the boot-up program code 114 includes instructions to select the lowest numbered properly functioning head to carry out the initial data access.

In accordance with one embodiment, during certification of the data storage device, if the lowest numbered head (default boot-up head) is found to be faulty, a fault status of this head is stored in NVM 112 and the certification process continues to the next lowest numbered head, which is now the default boot-up head. The designation of heads as faulty in NVM 112 continues until a properly functioning default boot-up head is encountered. With a properly functioning default boot-up head, fault statuses of any remaining heads can be stored either in NVM 112 or any other memory, within the head assembly, that the properly functioning default boot-up head can access.

In the above embodiments, an ascending order of head selection has been described. However, instead of an ascending order of head selection, a descending order or any other default boot-up head selection technique can be used. Since, in the above embodiments, head fault status information is maintained only in the head assembly 102 and is independent of the PCBA 104, replacement of the PCBA 104 or the HSA 106 in the data storage system 100 can be carried out with any substantial reconfiguration of system 100.

Figure 2:
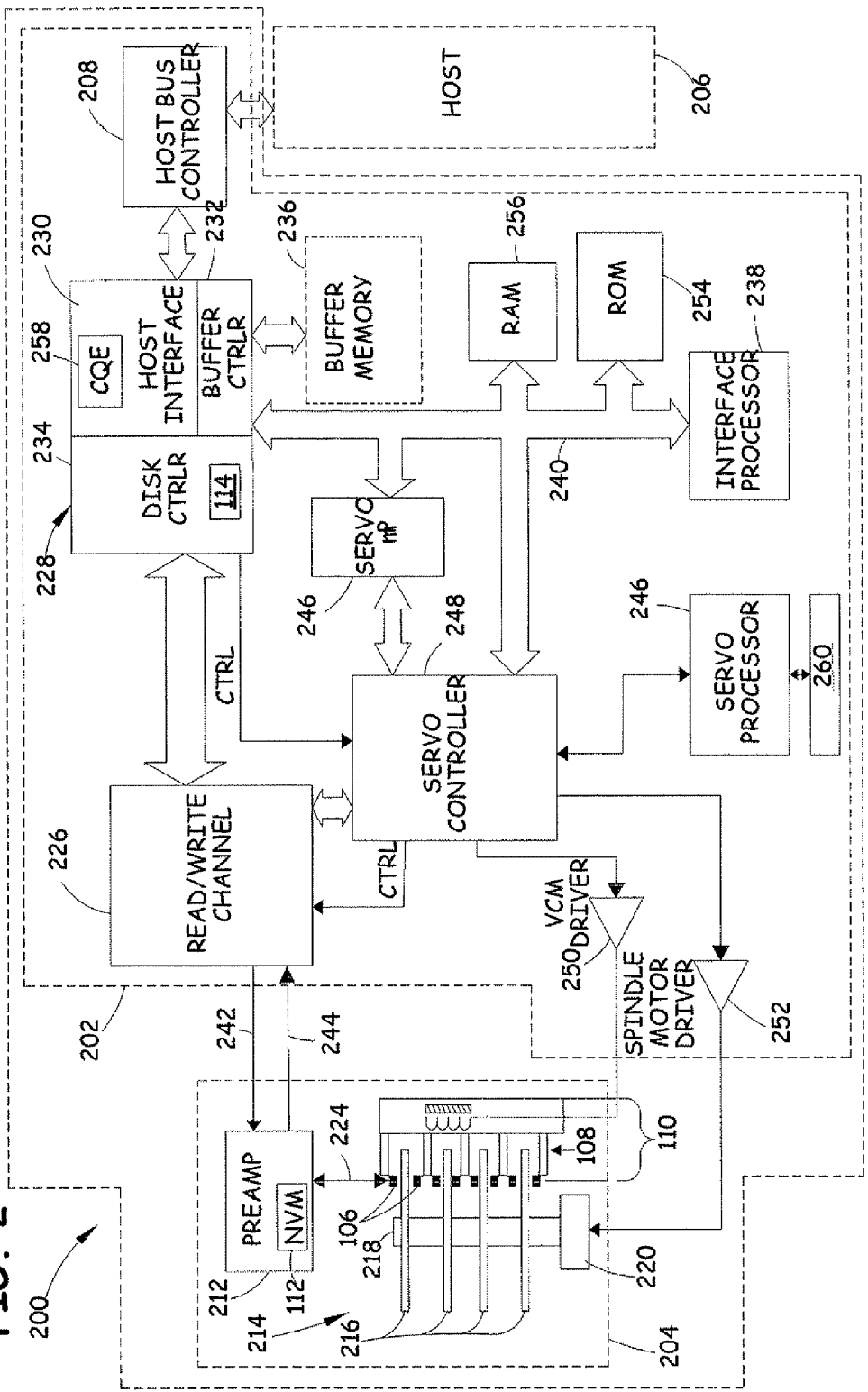
FIG. 2 is a block diagram of a disc drive in accordance with one embodiment.

Referring now to FIG. 2, a simplified block diagram of a disc drive employing a head stack assembly (HAS) that includes a NVM in accordance with one embodiment, is shown. The same reference numerals are used in FIG. 2 for elements that similar to those includes in FIG. 2. Disc drive 200 includes a PCBA 202 and a head stack assembly (HSA) 204. PCBA 202 includes circuitry and processors, which provide a target interface controller for communicating between a host system 206 and HSA 204. Host system 206 can include a microprocessor-based data processing system such as a personal computer or other system capable of performing a sequence of logical operations. Data is transmitted between host system 206 and PCBA 202 via a host bus connector 208. HSA 204 includes an actuator assembly 110, a preamplifier 212, and a disc assembly 214. Disc assembly 214 includes a plurality of media discs, stacked on a spindle assembly 218. Spindle assembly 218 is mechanically coupled to a spindle motor 220 for rotating the disc at a high rate of speed.

Actuator assembly 110 includes a voice coil motor, and multiple actuator arms 108. Located at the end of each actuator arm are heads 106, which are associated with a respective disc surface. Heads 106 communicate with disc controller circuit board 202 via a cable assembly 224 connected to preamplifier 212 for reading and writing data to the head's associated disc surface. Preamplifier 212 provides an amplified signal to a read/write channel 226 of PCBA 202. Read/write channel 226 performs encoding and decoding of data written to and read from the disc.

A servo processor 246 provides intelligent control of actuator assembly 110 and spindle motor 220 through a servo controller 248. By commands issued to servo controller 248 by servo processor 246, VCM driver 250 is coupled to move actuator assembly 210 and spindle motor driver 252 is coupled to maintain a constant spin rate of spindle motor 220.

PCBA 202 includes a host interface disc controller (HIDC) application-specific integrated circuit (ASIC) 228. ASIC 228 includes a host interface 230, a buffer controller 232, and a disc controller 234. Host interface 230 communicates with host system 206 via host bus connector 208 by receiving commands and data from and transmitting status and data back to host system 206. A command cueing engine (CQE) 258 is incorporated in host interface 230. Buffer controller 232 controls a non-volatile buffer memory 236.

Disc controller 234 tracks the timing of data sectors passing under a currently selected head and accordingly sends data to and receives data from read/write channel 226. Disc controller 234 also provides for error correction and error detection on data transmitted to and read from discs 214.

An interface processor 238 manages a cue of commands received from host 206 with the assistance of the CQE 258 embedded in host interface 230. Interface processor 238 interfaces with functional elements of PCBA 202 over a bus 240, for transfer of commands, data, and status.

Disc system operational programs may be stored in read-only memory (ROM) 254, and are loaded into random access memory (RAM) or program loading memory 256 for execution by interface processor 238. Suitably, servo processor 246 may have integrated or separate memory 260 for storage of servo programs.

In disc drive 200, boot-up program code 104, of the type described in connection with FIG. 1, is stored in disc controller 234. During testing of drive 200 for head performance and stability, if a default boot-up head is found to be faulty, a fault status of this head is stored in NVM 112, which, in one embodiment, is within preamplifier 212. In a specific embodiment, NVM 112 comprises a fuse for the default boot-up head. If the default boot-up head fails the test, the fuse for the faulty head is blown. As in the case of the previously described embodiment in FIG. 1, with a properly functioning default boot-up head, fault statuses of any remaining heads can be stored either in NVM 112 or any other memory that the properly functioning default boot-up head can access. In a specific embodiment, faulty statuses of any remaining heads are written on system tracks, on one or more discs 216 of the HSA 204, in a depopulated head table that can be accessed by the default boot-up head.

It should be noted that disc drive 200 can be a magnetic disc drive, an optical disc drive or any other type of disc drive. The principle of the present disclosure can also be applied to other data storage devices, such as probe storage devices, which utilize an array of heads.

Figure 3:
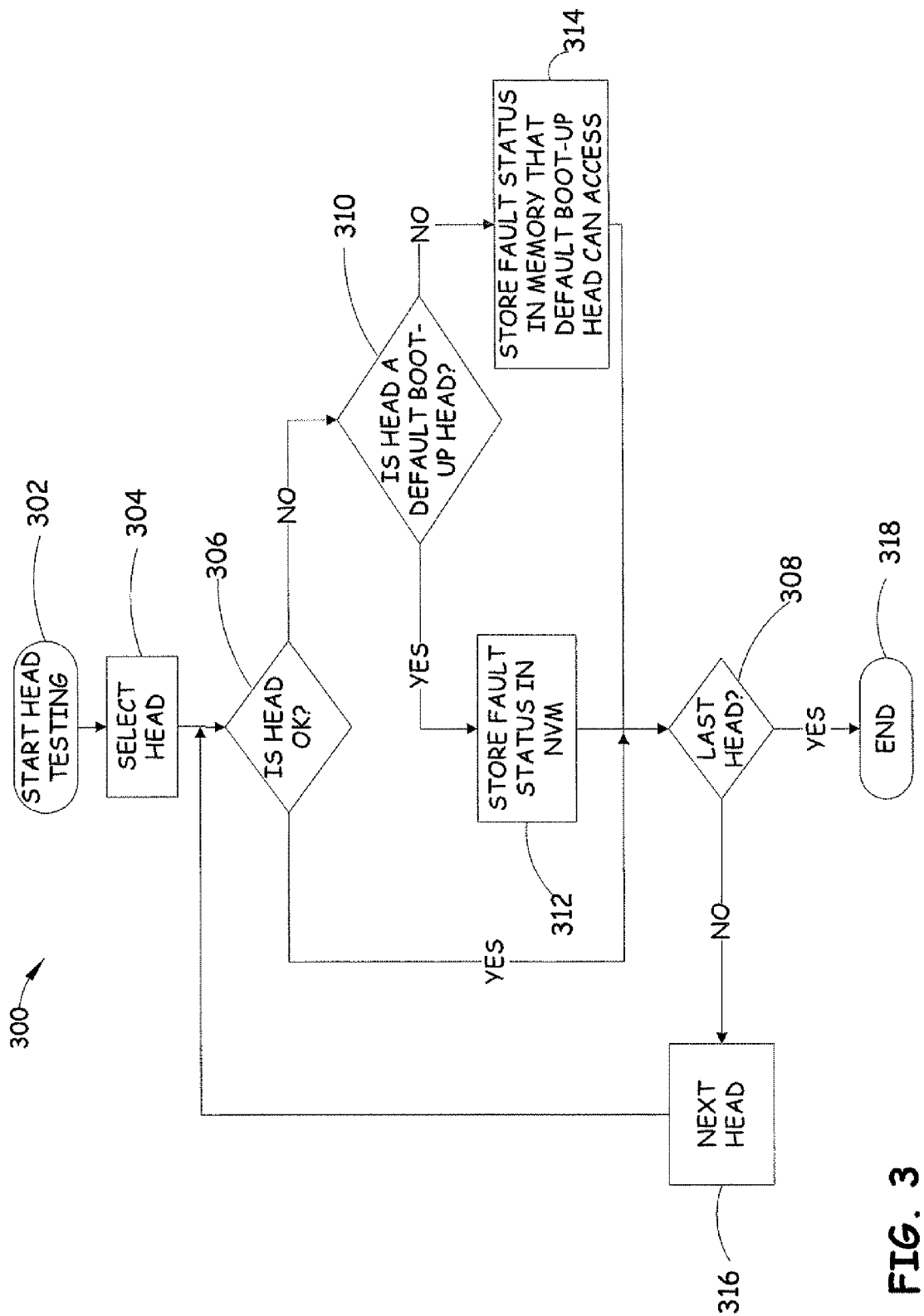
FIG. 3 is a flowchart of a method embodiment.

Referring now to FIG. 3, a flowchart 300 of an exemplary method of testing heads in a head assembly is shown. The head testing method starts at step 302. At step 304, one of the heads is selected for testing. The selected head is tested at step 306. If the head passes the test, control moves to step 308. If the head is found to be faulty, a determination is then made as to whether it is a default boot-up head. This is illustrated at step 310. If the head is a default boot-up head, at step 312, a fault status for the head is stored in a non-volatile memory, which the heads cannot access, in the head assembly. If the head is not a default boot-up head, at step 314, a fault status for the head is stored, for example, in any memory that the default boot-up head can access. From both steps 312 and 314, control moves to step 308. At step 308, a determination is made as to whether the selected head is the last head. If the selected head is not the last head, at step 316, a next head is selected and control is returned to step 306. If the selected head is the last head, the head testing process ends at step 318. Different techniques, some of which are set forth above, can be employed to carry out the steps shown in the flowchart of FIG. 3 while maintaining substantially the same functionality without departing from the scope and spirit of the present disclosure.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular type of data storage system (disc drive, probe storage system, etc.) in which the head assembly is used without departing from the spirit and scope of the present disclosure.

What is claimed is:
1. A method comprising:
  testing heads in a head assembly that includes a default boot-up head and at least one other head; and
  if the default boot-up head fails the test, designating the default boot-up head as faulty in only a non-volatile memory in the head assembly.
2. An apparatus comprising:
  a head assembly comprising:
    a non-volatile memory configured to store a status of a default boot-up head in the head assembly, wherein, if the default boot-up head is found to be faulty, only the non-volatile memory is configured to store a fault status of the default boot-up head.

3. The apparatus of claim 2 and wherein, in addition to the default boot-up head, the head assembly comprises at least one other head and at least one other memory.

4. The apparatus of claim 3 and wherein, if the at least one other head is found to be faulty, the at least one other memory is configured to store a fault status of the at least one other head.

5. The apparatus of claim 2 and wherein the non-volatile memory comprises a fuse, and wherein a blown status of the fuse is indicative of the default boot-up head being faulty.

6. The apparatus of claim 2 and wherein, in addition to the default boot-up head, the head assembly comprises at least one other head.

7. The apparatus of claim 6 and further comprising a head stack assembly that includes the head assembly.

8. The apparatus of claim 7 and wherein the head stack assembly comprises a preamplifier that includes the non-volatile memory.

9. The apparatus of claim 7 and wherein the head stack assembly comprises a data storage medium that the default boot-up head can access.

10. The apparatus of claim 9 and wherein the data storage medium that the default boot-up head can access is configured to store the status information for the at least one other head in a depopulated head table.

11. The apparatus of claim 10 and wherein the data storage medium that the default boot-up head can access is configured to store the status information for the at least one other head in the depopulated head table on at least one track on the data storage medium.

12. The apparatus of claim 7 and further comprising a printed circuit board assembly (PCBA) that is separate from the head stack assembly.

13. The apparatus of claim 12 and wherein the PCBA comprises circuitry and a processor, which provide a target interface controller that communicates between a host system and the head stack assembly.

14. The apparatus of claim 13 and wherein the PCBA comprises boot-up program code that includes head-selection instructions.

* * * * *